United States Patent [19]

Hayashi et al.

[11] Patent Number: 5,673,211
[45] Date of Patent: Sep. 30, 1997

[54] DIGITAL DATA REPRODUCING APPARATUS

[75] Inventors: Hideki Hayashi; Masaru Umezawa, both of Tsurugashima, Japan

[73] Assignee: Pioneer Electronic Corporation, Tokyo, Japan

[21] Appl. No.: 619,298

[22] Filed: Mar. 21, 1996

[30] Foreign Application Priority Data

Mar. 24, 1995 [JP] Japan .................................. 7-066532

[51] Int. Cl.⁶ .................................. G06J 1/00; G06F 1/02
[52] U.S. Cl. .................................. 364/607; 364/721
[58] Field of Search .................................. 364/607, 602, 364/825, 721

[56] References Cited

U.S. PATENT DOCUMENTS

| | | | |
|---|---|---|---|
| 4,755,961 | 7/1988 | Kuriki et al. | 364/745 |
| 5,258,933 | 11/1993 | Johnson et al. | 364/602 |
| 5,381,355 | 1/1995 | Birangi et al. | 364/602 |
| 5,442,575 | 8/1995 | Gast et al. | 364/602 |

Primary Examiner—Tan V. Mai
Attorney, Agent, or Firm—Perman & Green, LLP

[57] ABSTRACT

A digital data reproducing apparatus performs an accurate data decoding by appropriately correcting a phase error as well as a level error in sample values of a read signal. When a sampling value with an absolute value smaller than a specified value is extracted from a sample value series of the read signal successively outputted from an A/D converter according to a timing of a sampling clock pulse, the value is obtained as an extracted value and also a slant signal indicating a positive or negative sign of a slant in a portion corresponding to the extracted sample value in the sample value series is obtained, and a phase in the sampling clock pulse is corrected according to the extracted sample value as well as the slant signal, and also a level of an output sample value from the A/D converter is corrected according to the extracted sample value, and digital data according to the sample value subjected to the level correction is decoded. With this feature, it is possible to automatically correct a phase in the sampling clock pulse as well as a level of the sample value to their optimal state, so that a high-precision sample value can be obtained, which suppresses increase of any error in decoded data.

5 Claims, 7 Drawing Sheets

DIGITAL DATA REPRODUCING APPARATUS

BACKGROUND OF THE INVENTION

1. Field of the Invention

The present invention relates to a digital data regenerating apparatus for regenerating digital data according to a read signal from a recording medium in which digital data is recorded.

2. Description of Background Information

VITABI decoding is known as a decoding system to reproduce digital data with high reliability from a recording medium in which digital data is recorded at a high recording density. In the VITABI decoding, a read signal from the recording medium is subjected to A/D (analog to digital) conversion to obtain a sample value, and a square error between a sample value actually obtained and an ideal sample value in a case where it is assumed that no noise is generated. Then the square errors are serially accumulated for each data series, and data series in which the accumulated square errors is smallest is selected and outputted as decoding data. By executing the data decoding described above, high reliability decoding of digital data is possible even in a case where a recording density is high, or in a case where an S/N of the read signal is low.

To achieve high performance by accurately executing the VITABI decoding, it is required to precisely execute a phase control for controlling a phase in a sampling clock pulse in A/D-conversion of the read signal and a level control in which a center level of the sample value is set to a zero level.

As for a phase control for a sampling clock, as shown in FIG. 1, there is a method in which a read signal outputted from a pickup 1 is passed through an RF amplifier 2, and is sliced by a slicer 3 to a binary pulse, and a sampling clock pulse in a phase synchronized to a pulse edge of the binary pulse is generated by using a PLL circuit 4.

As for a level control, as shown in FIG. 1, there is a method in which a read signal through the RF amplifier 2 is passed through an AC coupler 5, and a bias voltage equal to the center level of an input range (called as an A/D center level hereinafter) in an A/D converter 6 is loaded to the read signal in the AC coupler 5. Namely, if the zero level of the read signal coincides with the A/D center level as shown in part (a) of FIG. 2, an accurate sample value can be obtained as shown in part (b) of FIG. 2.

As for the phase control, however, to compensate for a delay intrinsically generated in each of the circuits namely slicer 3, PLL circuit 4 as well as A/D converter 6, it has been required to optimize a sampling phase by providing a delay adjusting circuit 7 in an output section of the PLL circuit 4 to adjust a delay rate.

Also, there are some problems as described below on the level control. In a case where an optical disk is used as a recording medium, a pit length formed on the surface of the optical disk may be extended or shrunk in some degree to deviation of a recorded power. As a result, a phenomenon called as asymmetry in which a read signal becomes asymmetrical in the vertical direction occurs. Also, it is desirable that the recorded digital data is what is called a DC free code which does not include any DC current element like 8/10 code, and otherwise, because a recorded code has a DC current element or a low frequency element, a read signal also has a DC current or a low frequency element.

As described above, when the asymmetry has occurred or when non-DC free code is used, even if a bias voltage is loaded thereto as described in FIG. 1 the center level of the read signal has an offset to the A/D center level as shown in part (a) of FIG. 3, and as a result the sample value obtained thereby becomes at an inaccurate level as shown in part (b) of FIG. 3. Also, when the offset changes in association with passage of time as shown in part (a) of FIG. 4, the level of sample value becomes inaccurate as shown in part (b) of FIG. 4. As a result of the fact that a level error is generated in the sample value after A/D conversion due to generation of an offset or the variation thereof as described above, decoding performance becomes worse and errors in decoding data increase.

OBJECT AND SUMMARY OF THE INVENTION

It is an object of the present invention to provide a digital data reproducing apparatus in which a phase error as well as a level error of a sample value for a read signal are suitably corrected and enabling accurate data decoding. The digital data reproducing apparatus according to the present invention is the one for reading up a recorded signal in a recording medium in which digital data is recorded and regenerating the digital read data, and comprises an A/D converter for converting an analog read signal read up from the recording medium by a read means to a digital sample value according to a timing of a sampling clock pulse and outputting it; a sample extracting means for outputting, when a sample value with an absolute value smaller than a specified value is extracted from sample value series successively outputted from the A/D converter, the sample value as an extracted sample value and outputting a slant signal indicating the sign (a positive or negative sign) of the slant in a portion corresponding to the extracted sample value in the sample value series; a phase control means for correcting a phase in a sampling clock pulse according to the extracted sample value as well as the slant signal; a level control means for correcting a level of an output sample value from the A/D converter according to the extracted sample value; and a decoding means for decoding and obtaining the digital data according to the sample value subjected to the level correction by the level control means.

The digital data reproducing apparatus according to the present invention is the one for reading a recorded signal in the recording medium with digital data recorded therein and regenerating the read digital data, and comprises an A/D converter for converting an analog read signal read from the recording medium by a reading means to a digital sample value according to a timing of a sampling clock pulse and outputting the signal; a sample extracting means for extracting a plurality of sample values each having an absolute value smaller than a specified value from the sample value series successively outputted from the A/D converter to obtain an average value thereof and outputting the value as an extracted sample value, and outputting a slant signal indicating a positive or negative sign of the slant in each portion corresponding to the plurality of sample values in the sample value series; a phase control means for correcting a phase in a sampling clock pulse according to the extracted sample value as well as the slant signal; a level control means for correcting a level of an output sample value from the A/D converter according to the extracted sample value; and a decoding means for decoding and obtaining the digital data according to the sample value subjected to the level correction by the level control means.

With the present invention, when a sample value with the absolute value smaller than a specified value is extracted from the sample value series of read signal successively outputted from the A/D converter according to a timing for a sampling clock pulse, the value is obtained as an extracted sample value, and a slant signal indicating a positive or negative sign of the slant in a portion corresponding to the extracted sample value in the sample value series is obtained to correct a phase in the sampling clock pulse according to the extracted sample value as well as slant signal, and also the digital data is obtained through decoding according to the sample value subjected to the level correction. Also with the present invention, a plurality of sample values each having an absolute value smaller than a specified value are extracted from the sample value series of read signal successively outputted from the A/D converter according to a timing for a sampling clock pulse to compute an average thereof; the average value is obtained as an extracted sample value, and also a slant signal indicating a positive or negative sign of the slant in each portion corresponding to the plurality of sample values in the sample value series is obtained; a phase in the sampling clock pulse is corrected according to the extracted sample value as well as the slant signal; and a level of a sample value outputted from the A/D converter is corrected according to the extracted sample value, then the digital data is obtained through decoding according to the sample value subjected to the level correction.

DETAILED DESCRIPTION OF PREFERRED EMBODIMENTS

Detailed description is made hereinafter for embodiments of the present invention with reference to the related drawings.

Figure 1:
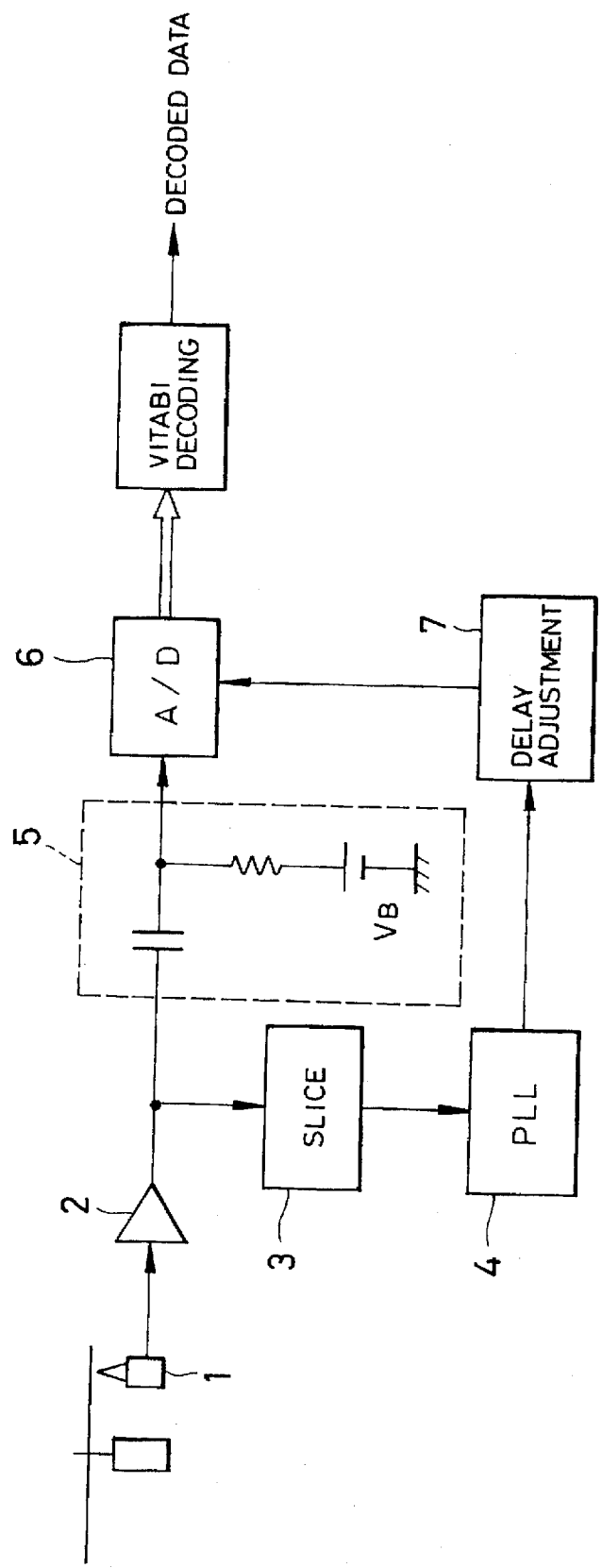
FIG. 1 is a block diagram showing a conventional type of digital data reproducing apparatus.
Figure 2:
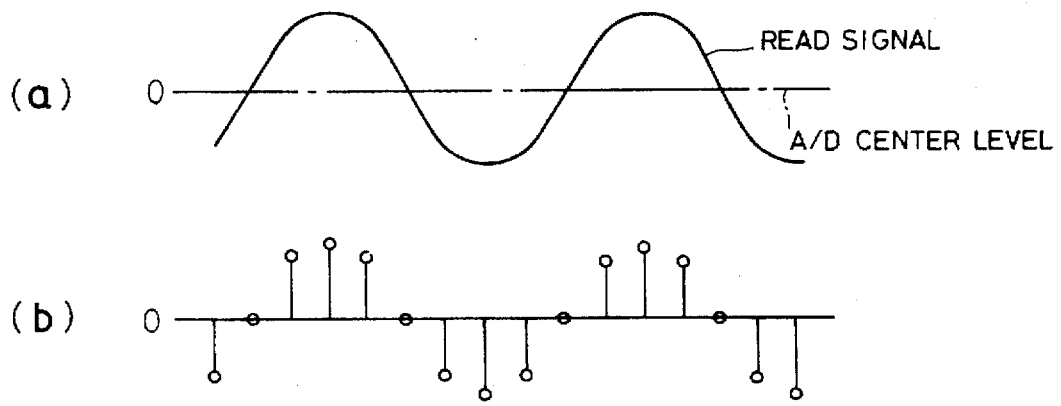
FIG. 2 is a view showing an operation waveform when the device in FIG. 1 is normally operated.
Figure 3:
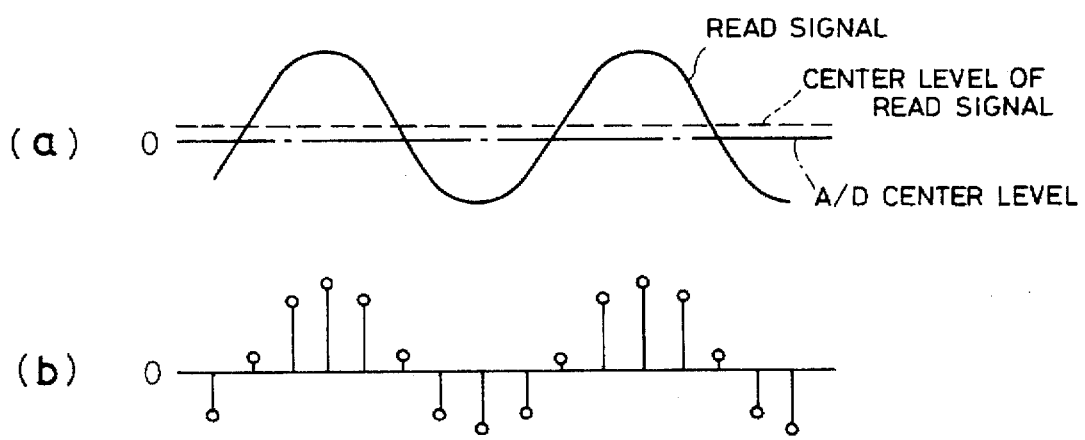
FIG. 3 is a view showing an operation waveform in a case where the device in FIG. 1 has an offset to an A/D center level.
Figure 4:
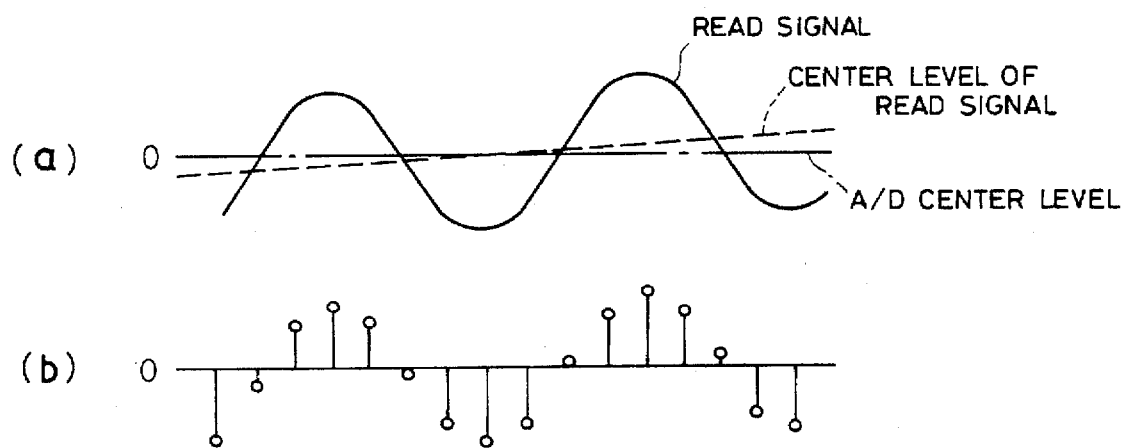
FIG. 4 is a view showing an operation waveform in a case where an offset changes in association with passage of time in the device in FIG. 1.
Figure 5:
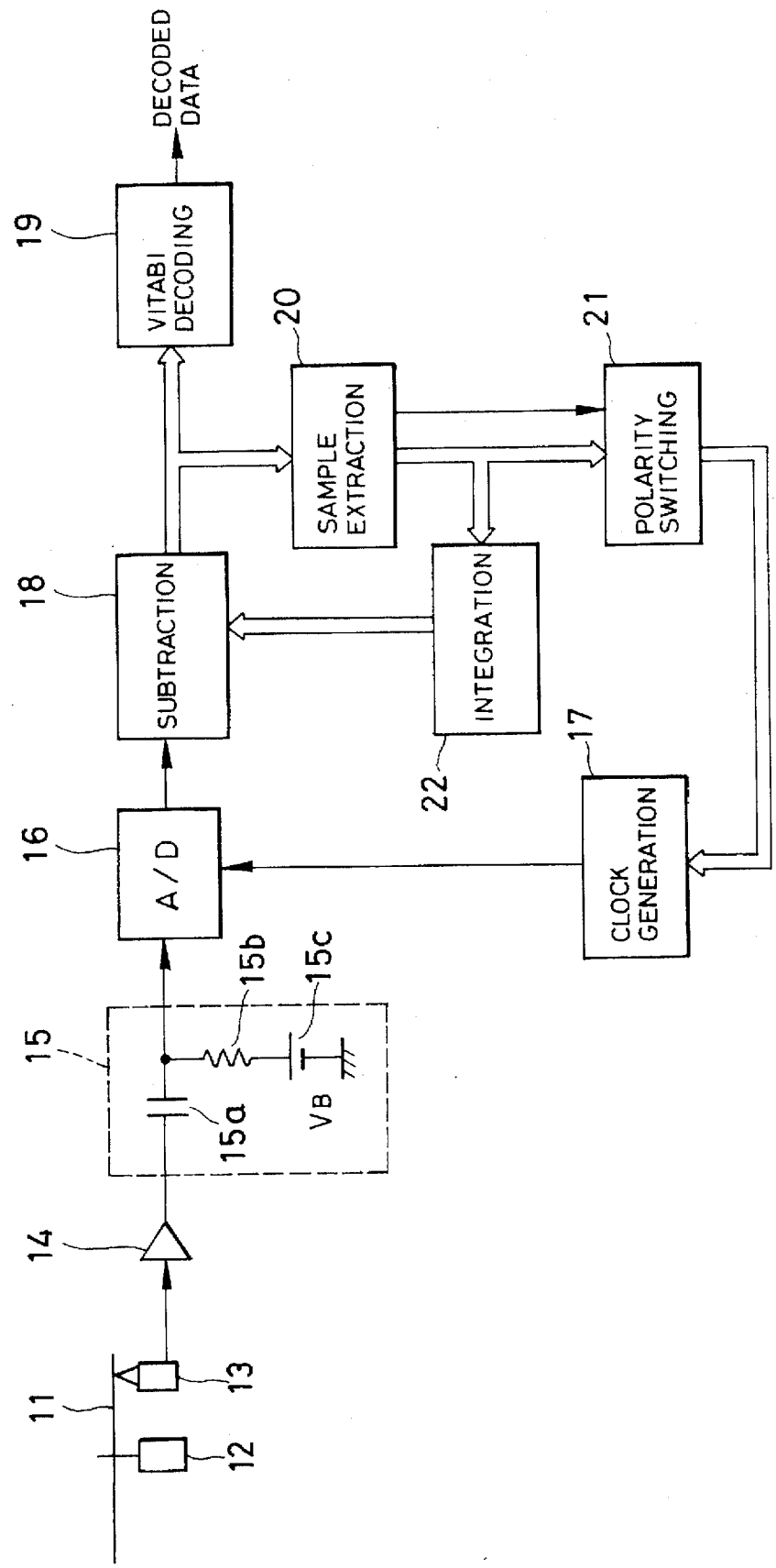
FIG. 5 is a block diagram showing an embodiment according to the present invention.

FIG. 5 shows an optical disk player in which the digital data reproducing apparatus according to the present invention is applied. In a circular optical disk 11 set in the optical disk player, for instance, a recorded signal which is digital data such as audio data is recorded along a spiral or concentric track as a pit line. The optical disk 11 is rotatively driven by a spindle motor 12, and the digital data recorded in the optical disk 11 is optically read out by a pickup 13. A read signal, which is an RF signal outputted from the pickup 13, is an analog signal indicating a quantity of a reflected portion received from the optical disk 11 of an optical beam radiated in the pickup 13, and the signal is amplified by the RF amplifier 14 to be supplied to an AC coupler 15. The AC coupler 15 comprises a capacitor 15$a$, a resistor 15$b$, and a power supply unit 15$c$ generating a voltage VB, and gives a bias voltage to the read signal. The read signal to which a bias voltage is given by the AC coupler 15 is digitized by the A/D converter 16. A sampling clock pulse is supplied from a clock generator 17 to the A/D converter 16, and the read signal is synchronized to the sampling clock pulse and a sampling value of the read signal is outputted. The digitalized read signal, namely the sampling value is supplied to a subtracter 18. An output signal from the subtracter 18 is supplied to a VITABI decoder 19 as well as to a sample extractor 20.

The VITABI decoder 19 computes a branchmetric as well as a pathmetric according to a sample value successively supplied from the subtracter 18 and each of a plurality of predicted sample values, and depending on the computed value described above, data series in which a square error becomes minimum against the input series is decoded as decoded data corresponding to the recorded signal described above. An output signal from the decoder 19 is subjected, for instance, to EFM (Eight to Fourteen Modulation) by a demodulator in the downstream (not shown herein) to become a reproduced signal. The sample extractor 20 extracts a sample value around the zero level in which the absolute value of an output sample value from the subtracter 18 is smaller than a specified value, and detects a positive or negative sign of the slant in the sample value series before or after the extracted value to generate a slant signal. An extracted output from the sample extractor 20 is supplied to a polarity electronic switch 21 as well as to an integrator 22. The polarity electronic switch 21 switches a polarity of the extracted sample value by inverting it or without inverting it according to the sign of the slant, namely a slant signal, to obtain a phase error value. The phase error value is supplied to a clock generator 17. The clock generator 17 generates a sampling clock pulse having been subjected to phase correction according to the phase error value and supplies the generated pulse to the A/D converter 16 as described above. The integrator 22 obtains a level error value by smoothing the extracted sample value by means of integration thereof. The level error value is supplied to the subtracter 18. The subtracter 18 corrects a sample value level by subtracting a level error value from an output sample value from the A/D converter 16.

In FIG. 5, a portion comprising an A/D converter 16, a subtracter 18, a sample extractor 20, a polarity switching circuit 21, and a clock generator 17 forms a phase control loop to correct a sampling phase, and a portion comprising a subtracter 18, a sampling extractor 20, and an integrator 22 forms a level control loop to correct a sample value level.

Figure 6:
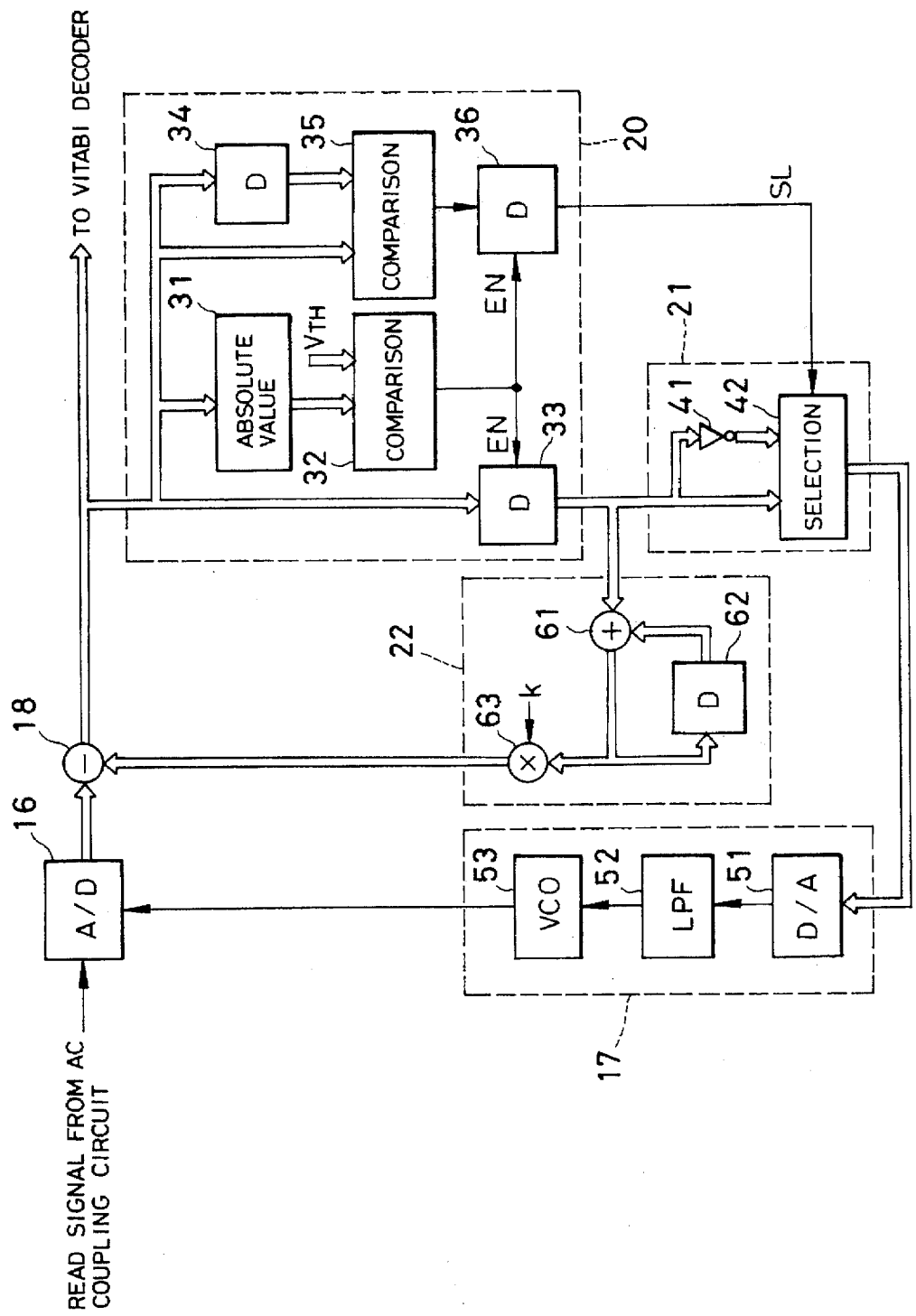
FIG. 6 is a block diagram showing detailed components of a phase control loop as well as of a level control loop in the device in FIG. 5.

FIG. 6 shows particular configuration of the phase control loop as well as of the level control loop. The sample extractor 20 comprises an absolute value circuit 31, comparators 32, 35, and D-flip flops 33, 34, 36. The absolute value circuit 31, the comparator 35, and D-flip flops 33, 34 each are connected to an output of the subtracter 18. The absolute value circuit 31 generates an absolute value of an output sample value from the subtracter 18 and outputs it to the comparator 32. The comparator 32 compares the absolute value to a specified value VTH, and generates an enable signal (EN) as a result of comparison when the absolute value is smaller than the specified value VTH. An output of the comparator 32 is connected to the D-flip flops 33, 36. The D-flip flop 33 fetches an output sample value from the subtracter 18 when the enable signal is supplied thereto, and outputs it to the polarity switching circuit 21 as well as the integrator 22 as an extracted sample value.

On the other hand, although not shown herein, but a sample clock pulse is supplied to the clock end of the D-flip flop 34, and an output sample value from the subtracter 18 is delayed by one sampling clock and supplied to the comparator 35. The comparator 35 compares the output sample value from the subtracter 18 to the sample value delayed by one sampling clock by means of the D-flip flop 34, and the output signal from the comparator 35 is supplied to an input terminal of the D-flip flop 36. The D-flip flop 36 fetches an output signal from the comparator 35 when an enable signal is supplied thereto from the comparator 32 and outputs it to the polarity switching circuit 21 as a slant signal (SL).

The polarity switching circuit 21 comprises an invertor 41 and a selector 42. The invertor 41 inverse the polarity of an output from the D-flip flop 33 to supply it to the selector 42. The selector 42 selectively switches either an output sample value from the D-flip flop or the sample value with polarity inverted by the invertor 41 according to a slant signal from the D-flip flop 36, and outputs it to the clock generator 17 by relaying as the phase error value described above.

The clock generator 17 comprises an D/A converter 51, an LPF 52 (Low pass filter), and a VCO 53 (Voltage control oscillator). The D/A converter 51 generates an analog signal according to a phase error value from the selector 42, the LPF 52 smooths an output signal from the D/A converter 51, and the VCO 53 generates a sampling clock pulse of a frequency according to the output signal from the LPF 52.

The integrator 22 comprises an adder 61, a D-flip flop 62, and a multiplier 63. The adder 61 adds an output sample value from the D-flip flop 33 to an output value from the D-flip flop 62. The D-flip flop 62 delays the resultant value from the adder 61 by one sampling clock and supplies it to the adder 61. Namely, the adder 61 and D-flip flop 62 constitute an accumulator. The multiplier 63 multiplies a coefficient k by the value obtained through addition in the adder 61 and supplies the multiplied value to the subtracter 18 as a level error value. The coefficient k may be specified as an exponent of 2 for bit shift.

With the configuration described above, now description is made for operations of the phase control loop first. If an absolute value of a current sample value outputted from the subtracter 18 is smaller than the specified value VTH, an enable signal is generated from the comparator 32, and the current sample value is outputted from the D-flip flop 33 according to the enable signal as an extracted sample value. The current sample value outputted from the subtracter 18 is compared to the previous (before one sampling clock) sample value in the comparator 35, and if the current sample value is more than the previous (before one sampling clock) sample value, the slant of the sample value series is positive, so that an output level from the comparator 35 becomes high, and if the current sample value is smaller than the previous sample value, the slant of the sample value series is negative, so an output level from the comparator 35 becomes low. The output level from the comparator 35 at a time point when an enable signal is generated from the comparator 32 is stored in the D-flip flop, and is outputted to the selector 42 as a slant signal.

The extracted sample value is supplied to the D/A converter 51 through the selector 42 when the sample value series has an ascending slant. On the other hand, when the sample value series has a descending slant, the selector 42 selectively outputs an output signal from the invertor 41 according to the slant signal, so that the polarity of extracted sample value is inverted by the invertor 41, then the inverted value is supplied to the D/A converter 51 through the selector 42. As described above, a value supplied from the selector 42 to the D/A converter 51 is a phase error value, and the phase error value is converted to an analog signal by the D/A converter 51. The analog signal is smoothed by the LPF 52 and supplied to the VCO 53, and an oscillating frequency from the VCO 53 is controlled, and for this reason a phase in a sampling clock to the A/D converter 16 is corrected.

Then description is made for operations of the level control loop. An extracted sample value from the D-flip flop 33 is integrated by accumulating the values at the adder 61 and the D-flip flop 62, and as a result the integrated value is smoothed. The smoothed extracted value is multiplied by the coefficient k in the multiplier 63, and supplied to the subtracter 18 as a level error value. In the subtracter 18, the level error value is subtracted from the current sample value supplied from the A/D converter 16 and the level thereof is corrected. Accordingly, the subtracted result is outputted to the VITABI decoder 19 as well as the sample extractor 20 as the corrected current sample value.

Figure 7:
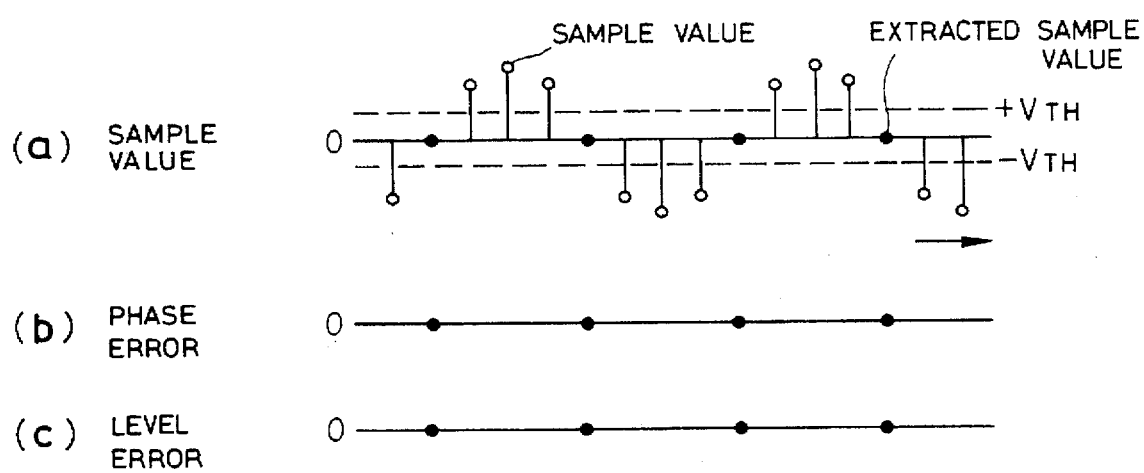
FIG. 7 is a view showing an operation waveform in a case where no phase error nor level error occurs in a sample value for a read signal.

FIG. 7 shows an operation waveform in a case where there is no phase error nor level error in a sample value for the read signal. Namely the sample values for the read signal are sampled at a timing as indicated with circles in part (a) of FIG. 7, and the sample values indicated with black dots are extracted ones each having an absolute value smaller than the specified value VTH. Each of the phase error value and the level error value becomes zero respectively according to the extracted sample value as shown in part (b) and part (c) of FIG. 7, and for this reason both the phase correction and the level correction do not take place.

Figure 8:
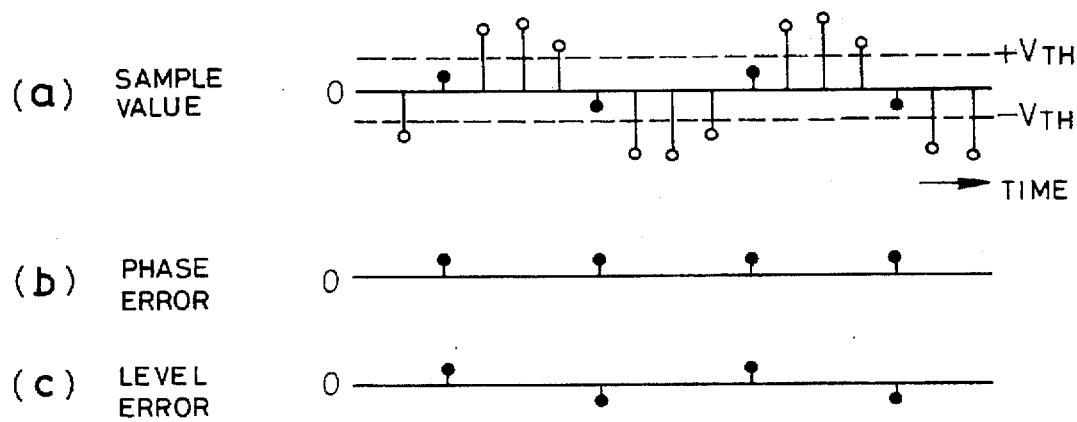
FIG. 8 is a view showing an operation waveform in a case where a phase error occurs in a sample value for a read signal.

Sample values for a read signal shown in part (a) of FIG. 8 indicate a case where a phase error in the direction, in which the clock phase is delayed, is generated, and sample values indicated with black dots are obtained as extracted sample values. In a case where a sample value series has a descending slant, the polarity of extracted sample values is inverted by the invertor 41, and for this reason phase error values at a positive level are uniformly obtained as shown in part (b) of FIG. 8. Also the extracted sample values exhibit ones alternatively at the positive or the negative level as shown in part (c) of FIG. 8, so that a level error value at the zero level can be obtained by smoothing the values. Accordingly, in a case of FIG. 8, whereas the generated phase error of the read signal is corrected by means of a phase error value at the positive level, the level correction is not executed because a phase error does not occur, which makes a level error value be at a zero level.

Figure 9:
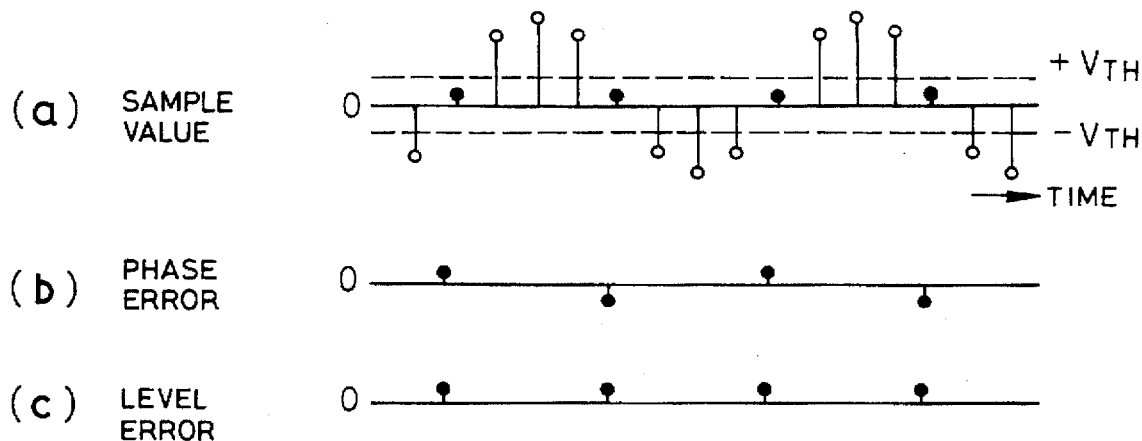
FIG. 9 is a view showing an operation waveform in a case where a level error occurs in a sample value for a read signal.

Sample values of a read signal shown in part (a) of FIG. 9 is a case where a level error in a direction, in which a signal level is slightly high, is generated, and sample values indicated by black dots can be obtained as extracted sample values. The phase error values exhibit alternatively the positive or the negative level by means of polarity inversion as shown in part (b) of FIG. 9. The level error values exhibit ones at the positive level with no change as shown in part (c) of FIG. 9. Accordingly, in a case of FIG. 9, as a phase error is not executed in the read signal, phase error values become at the zero level with phase correction not executed, and the generated level error is corrected by means of a level error value at the positive level.

As described above, an extracted sample value is used as a phase error value by switching the polarity thereof, and on the other hand the extracted sample value is used as a level error value without any change thereof, so that each of a phase control as well as a level control independently and accurately executes its correction respectively.

Figure 10:
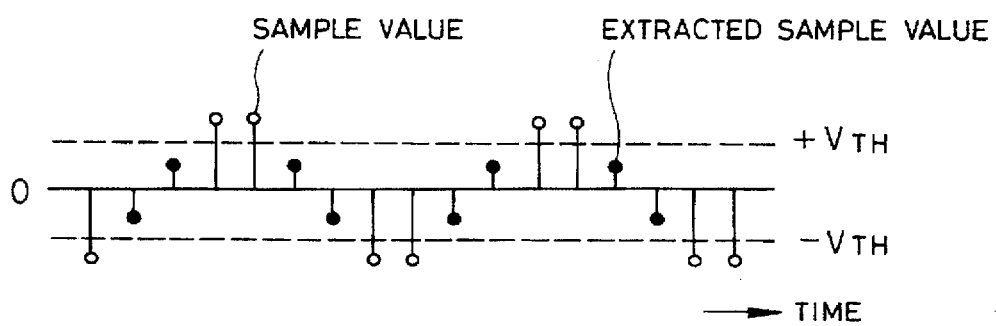
FIG. 10 is a view showing an example of a sample value extracted from a plurality of sample values.

It should be noted that, in the embodiment described above, a single sample value in which an absolute value of the current sample value is smaller than a specified value is extracted and used as an extracted sample value, but a plurality of sample values (black dots in FIG. 10) each having an absolute value smaller than the specified value may be used as extracted sample values by extracting and averaging them as shown in FIG. 10. The phase level control as well as level control after subjected to averaging are the same as those in the embodiment described above, and each correction is executed independently.

Figure 11:
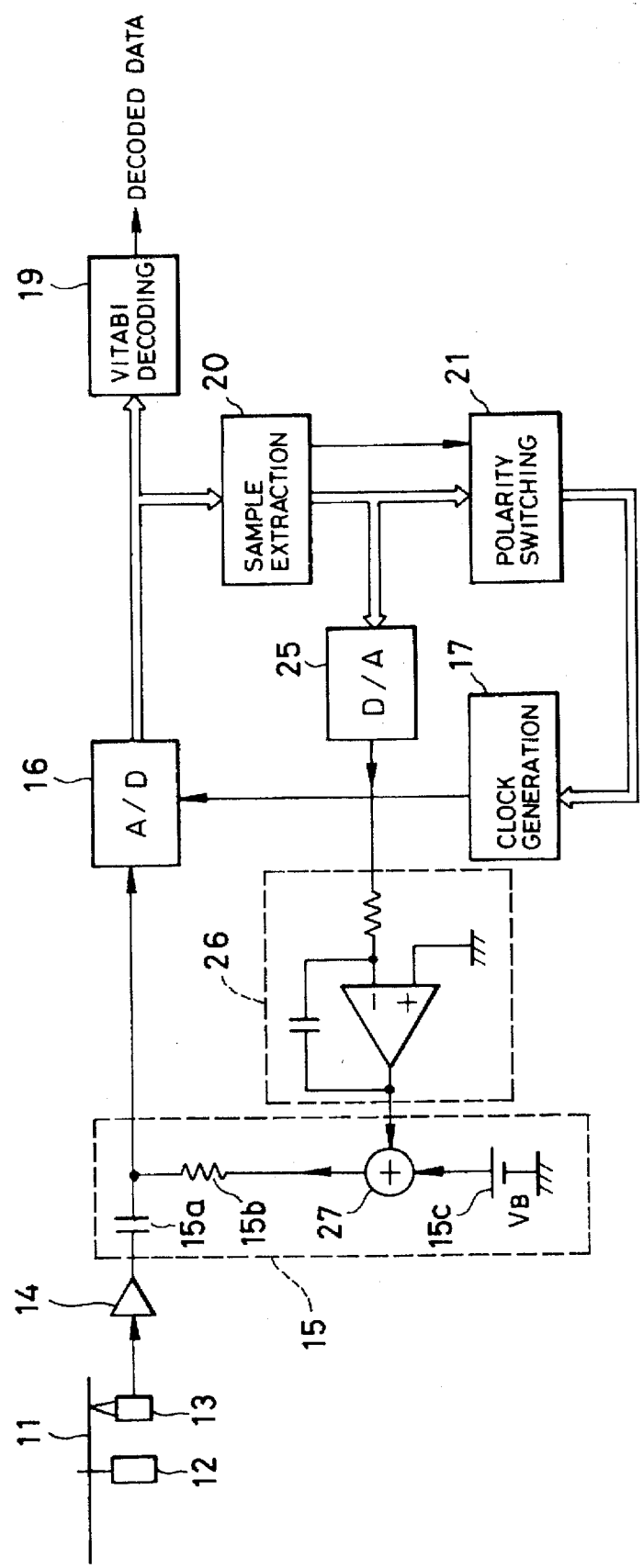
FIG. 11 is a block diagram showing another embodiment according to the present invention.

For a level control, a level error value may be fed back to an analog read signal supplied to the A/D converter 16 by using a D/A converter 25 as well as an analog integrator 26, and also by inserting an adder 27 into the AC coupler 15 as shown in FIG. 11. Herein, the analog integrator 26 executes polarity inversion as well as integration, so that a level error voltage is equivalently subtracted even if a bias voltage is added in the adder 27.

Also, in the embodiment described above, the VITABI decoder is used as a decoding means, but it is not limited thereto. For instance, a sample value obtained after A/D-converting may be passed through a digital filter to equalize waveforms and the MSB (Most significant bit) after equalized may be used as decoded digital data. In this case also, it is possible to enhance decoding performance with the phase control as well as level control.

With the present invention as described above, in the case where digital data is decoded according to a sample value after A/D conversion, it is possible to automatically correct a phase of a sampling clock pulse as well as a level of a sample value to their optimal state. As a result, a high-precision sample value can be obtained, which does not cause errors in decoded data to increase. Also a circuit can be used in common for a phase control as well as for a level control, and for this reason a small size for a circuit can be achieved.

What is claimed is:

1. A digital data reproducing apparatus for reading out a recorded signal in a recording medium in which digital data is recorded and regenerating said digital data comprising:

an analog to digital converting means for converting an analog read signal read out from said recording medium by a reading means to a digital sample value and outputting it according to a timing of a sampling clock pulse;

a sample extracting means for outputting, when a sample value with an absolute value smaller than a specified value is extracted from a sample value series successively outputted from said analog to digital converting means, the sample value described above as an extracted sample value and outputting a slant signal indicating a positive or negative sign of a slant in a portion corresponding to said extracted sample value in said sample value series;

a phase control means for correcting a phase in said sampling clock pulse according to said extracted sample value as well as to said slant signal;

a level control means for correcting a level of an output sample value from said analog to digital converting means according to said extracted sample value; and a decoding means for decoding said digital data according to the sample value subjected to level correction by said level control means.

2. A digital data reproducing apparatus according to claim 1, wherein said phase control means comprises a polarity switching means for switching a polarity of said extracted sample value according to said slant signal to convert it as a phase error signal; and a clock generating means for generating a sampling clock pulse subjected to phase correction according to said phase error signal.

3. A digital data reproducing apparatus according to claim 1, wherein said level control means comprises a smoothing means for smoothing said extracted sample values to be converted to level error signals; and a subtracting means for subtracting said level error signal from output sample values from said analog to digital converting means.

4. A digital data reproducing apparatus according to claim 1, wherein said level control means comprises a smoothing means for smoothing said extracted sample values to be converted to level error signals; and a subtracting means for subtracting said level error signal from said read signal.

5. A digital data reproducing apparatus for reading out a recorded signal in a recording medium in which digital data is recorded and regenerating said digital data comprising:

an analog to digital converting means for converting an analog read signal read from said recording medium by a reading means to a digital sample value and outputting it according to a timing of a sampling clock pulse;

a sample extracting means for outputting, when a plurality of sample values each having an absolute value smaller than a specified value are extracted from a sample value series successively outputted from said analog to digital converting means, the sample values described above as extracted sample values to obtain an average value thereof and outputting a slant signal indicating a positive or negative sign of a slant in each portion corresponding to said plurality of sample values respectively in said sample value series;

a phase control means for correcting a phase in said sampling clock pulse according to said extracted sample values and to said slant signal;

a level control means for correcting a level of output sample values from said analog to digital converting means according to said extracted sample values; and a decoding means for decoding said digital data according to the sample values subjected to level correction by said level control means.

* * * * *